US012761912B2

(12) United States Patent
Hristozov et al.

(10) Patent No.: US 12,761,912 B2
(45) Date of Patent: Oct. 13, 2026

(54) TRANSITIONING HOSTS TO DESIRED STATE-BASED MANAGEMENT

(71) Applicant: VMware LLC, Palo Alto, CA (US)

(72) Inventors: Georgi Hristozov, Sofia (BG); Mihail Ivanov, Sofia (BG); Ivaylo Dimitrov Ivanov, Sofia (BG); Branislav Abadzhimarinov, Sofia (BG); Atanas Vaskov Vasilev, Sofia (BG)

(73) Assignee: VMware LLC, Palo Alto, CA (US)

( * ) Notice: Subject to any disclaimer, the term of this patent is extended or adjusted under 35 U.S.C. 154(b) by 170 days.

(21) Appl. No.: 18/776,179

(22) Filed: Jul. 17, 2024

(65) Prior Publication Data

US 2026/0023556 A1 Jan. 22, 2026

(51) Int. Cl.

| | |
|---|---|
| ***G06F 9/455*** | (2018.01) |
| ***G06F 8/61*** | (2018.01) |
| ***G06F 8/71*** | (2018.01) |
| ***G06F 16/16*** | (2019.01) |
| ***G06F 21/57*** | (2013.01) |
| ***H04L 29/00*** | (2006.01) |
| ***H04L 29/06*** | (2006.01) |

(52) U.S. Cl.

CPC . *G06F 8/71* (2013.01); *G06F 8/61* (2013.01)

(58) Field of Classification Search

CPC ..... G06F 8/71; G06F 8/61; G06F 8/41; G06F 30/323; G06F 30/331; G06F 8/65; G06F 9/4552; G06F 9/45558; G06F 9/5088; G06F 9/5077; H04L 41/0897; H04L 41/0826

See application file for complete search history.

(56) References Cited

U.S. PATENT DOCUMENTS

| | | | | |
|---|---|---|---|---|
| 6,842,793 | B2 * | 1/2005 | Ohashi | G06F 11/0751 710/36 |
| 11,252,178 | B1 * | 2/2022 | Malveaux | H04L 63/1433 |

OTHER PUBLICATIONS

VMware LLC, Compliance & Vulnerability Scanning Frequently Asked Questions, 7 pages (Year: 2024).*

* cited by examiner

*Primary Examiner* — Thuy Dao

(74) *Attorney, Agent, or Firm* — Kim & Stewart LLP

(57) ABSTRACT

A management computer is configured to manage a desired state for hypervisors of a plurality of host computers, by performing the steps of: retrieving from each of the host computers, a plurality of binary files of a hypervisor executing on the host computer; for the hypervisor of each of the host computers, identifying installed software from the retrieved plurality of binary files, including: (1) a version of a base software image of the hypervisor, and (2) one or more of: a driver of the hypervisor, firmware of the hypervisor, and a software component for a software solution of the hypervisor; and in response to a selection of the identified installed software for the hypervisor of a first host computer: generating a desired state document including the selected installed software; and determining, for each of the host computers, a compliance status of the host computer with the generated desired state document.

20 Claims, 6 Drawing Sheets

TRANSITIONING HOSTS TO DESIRED STATE-BASED MANAGEMENT

BACKGROUND

In virtualized computing systems, host computers, referred to herein simply as "hosts," execute virtualized computing instances such as virtual machines (VMs). Virtualization software, also referred to as a hypervisor, is installed on each of the hosts, the hypervisor supporting the execution of the VMs. A hypervisor may be installed on a host using an ISO image, which is a file that includes a copy of the data of a storage device such as a compact disk (CD). The data, which may be in the form of binary computer files, may be grouped into units of shipment and installation, such units referred to herein as "software components."

For example, each ISO image for a hypervisor may include a base software image, which is a collection of software components sufficient for booting up the hypervisor. The base software image may include, e.g., one or more software components for a kernel, the kernel being a computer program that performs core functionalities such as preventing conflicts between processes of the hypervisor. As another example, each ISO image may include add-ons on top of the base software image, which are software components that customize the ISO image, e.g., for particular hardware devices of a host. The add-ons may include, e.g., device drivers, which are computer programs that provide software interfaces for the hardware devices. The add-ons may also include, e.g., firmware, which is software that provides low-level control of the hardware devices such as data manipulation.

As another example, each ISO image may include additional software components on top of the base software image, to enable software solutions supported by a hypervisor such as high availability (HA) and software-defined networking (SDN). A software solution is a set of software applications or programs designed to meet specific business or operational needs. A software solution typically addresses a particular problem or fulfills a particular requirement for individuals, businesses, or organizations. Software solutions can range from simple applications to complex systems that integrate various functions and processes.

After installing hypervisors on the hosts of a virtualized computing system, lifecycle management is cumbersome and error-prone. As described above, the software components for a hypervisor may be layered and complex, with a base software image and various add-ons and additional software components layered on top. All these software components have inter-dependencies, and it is challenging to update software components of, add software components to, and remove software components from a hypervisor without violating dependencies or introducing incompatibilities between software components. Accordingly, a desired state model for managing the lifecycle of hypervisors has been developed. According to the desired state model, a desired state is expressed for one or more hosts in a file such as a JavaScript Object Notation (JSON) file.

To create the desired state file, the software components that should be installed may be composited by selecting, e.g., a base software image, add-ons such as device drivers and firmware, and additional software components of software solutions (and versions for such selections). Based on the desired state file, the hypervisors of corresponding hosts are updated to reflect the software components identified by the desired state file. However, compositing the software components for a desired state file is still cumbersome and error-prone. Indeed, it is challenging to select the different layers for the desired state document in a manner that will not violate dependencies or introduce incompatibilities between software components when the hosts are updated accordingly. A method for desired-state management of hypervisors of hosts that is simpler and less error prone is desired.

SUMMARY

One or more embodiments provide a management computer including a processor and memory, wherein the processor executes instructions stored in the memory to manage a desired state for hypervisors of a plurality of hosts. The management computer performs the steps of: retrieving from each of the hosts, a plurality of binaries of a hypervisor executing on the host; for the hypervisor of each of the hosts, identifying installed software from the retrieved plurality of binaries, including: (1) a version of a base software image of the hypervisor, and (2) one or more of: a driver of the hypervisor, firmware of the hypervisor, and a software component for a software solution of the hypervisor; and in response to a selection of the identified installed software for the hypervisor of a first host computer of the host computers: generating a desired state document including the selected installed software; and determining, for each of the hosts, a compliance status of the host with the generated desired state document.

Further embodiments include a method comprising the above steps and a non-transitory computer-readable storage medium comprising instructions that cause a management computer to carry out the above steps.

DETAILED DESCRIPTION

Figure 1:
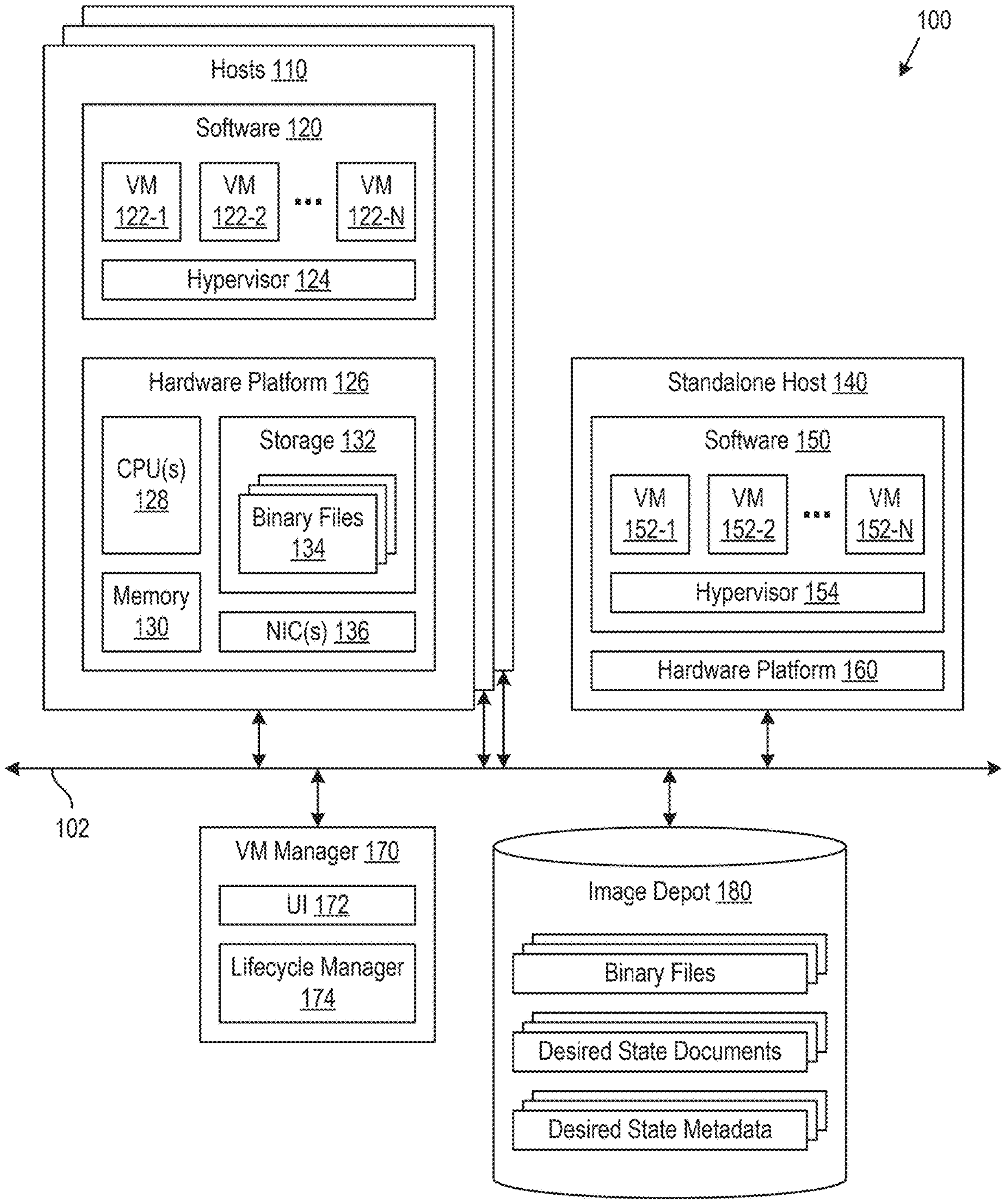
FIG. 1 is a block diagram of a computer system in which embodiments may be implemented.

Techniques are described for desired-state management of hypervisors of hosts. The techniques involve generating desired state documents for hosts based on software currently installed on the hosts. Such techniques may be applied to both "standalone" hosts and "clusters" of hosts. A standalone host is a host that is managed individually, i.e., separately from other hosts. A cluster is a group of hosts that are managed together to provide cluster-level functions such load balancing across hosts of the cluster, distributed power management, dynamic VM placement according to affinity and anti-affinity rules, and HA.

To manage the desired state of a standalone host, the techniques involve retrieving the binary files of a hypervisor currently executing on the standalone host. The binary files are sequences of bits representing the data installed in storage of the host for executing the hypervisor. Those binary files are scanned to identify software installed on the host, including, e.g., a base software image, add-ons such as device drivers and firmware, and additional software components of software solutions (and versions for such installed software). Software that is installed on a host is code that has been configured to be executed by that host, such configuration including, e.g., creating directories in a local file system of the host to be used by the software, storing executable code for the software in files of the local file system, and setting environment variables to be used by the software. Such identified software may be, e.g., selected automatically as a new desired state for the standalone host, or displayed to an administrator via a UI along with an option to select such identified software as the new desired state. Upon selection, a desired state document is generated.

To manage the desired state of a cluster of hosts, the techniques may involve retrieving the binary files of hypervisors executing on each of the hosts of the cluster. For each host, the binary files are sequences of bits representing the data installed in storage of the host for executing the hypervisor. Those binary files are scanned to identify software installed on each of the hosts, similarly to the scanning for a standalone host. If the hypervisors of the hosts of the cluster are homogenous, i.e., if the installed software is the same for each of the hosts, such identified software may be, e.g., selected automatically as a new desired state for the cluster, or displayed to an administrator via the UI as an option to select as the new desired state. If the hypervisors of the hosts are heterogenous, i.e., if there are differences between the hosts in terms of the installed software, one combination of software may be selected automatically as the new desired state for the cluster, or multiple options may be displayed to an administrator via the UI for the new desired state. Each combination (or option) includes installed software identified from one of the hosts. Upon selection, a desired state document is generated.

The embodiments simplify the process for managing the hypervisors of hosts by automatically generating combinations of software for a desired state document. Such combinations avoid violating dependencies or introducing incompatibilities between software components. This is because such combinations are based on software that is already installed in hosts and which is thus already being executed by hypervisors on the hosts. These and further aspects of the invention are discussed below with respect to the drawings.

FIG. 1 is a block diagram of a computer system 100 in which embodiments may be implemented. Computer system 100 includes a cluster of hosts 110, a standalone host 140, a VM manager 170, and an image depot 180. Computer system 100 may also include additional clusters of hosts and additional standalone hosts, but only one cluster and one standalone host are illustrated for simplicity.

Each of hosts 110 is constructed on a hardware platform 126 such as an x86 architecture platform. Hardware platform 126 includes components of a computer, such as one or more central processing units (CPUs) 128, memory 130 such as random-access memory (RAM), local storage 132 such as one or more magnetic drives or solid-state drives (SSDs), and one or more network interface controllers (NICs) 136. CPU(s) 128 are configured to execute instructions such as executable instructions that perform one or more operations described herein, which may be stored in memory 130. Local storage 132 of each of hosts 110 includes binary files 134, which include data for executing, e.g., a base software image of a hypervisor, various add-ons such as device drivers and firmware of a hypervisor, and software components for software solutions of a hypervisor. Local storage 132 of hosts 110 may optionally be aggregated and provisioned as a virtual storage area network (vSAN). NICs 136 enable hosts 110 to communicate with each other and with other devices over a network 102 such as a local area network (LAN).

Hardware platform 126 of each of hosts 110 supports software 120. Software 120 includes a hypervisor 124, which is a software layer or component that supports the execution of multiple virtualized computing instances such as VMs 122. A virtualized computing instance is an addressable data compute node (DCN) or isolated user space instance, such as a VM or container. On each of hosts 110, hypervisor 124 is installed using binary files 134. One example of hypervisor 124 is a VMware ESX® hypervisor, available from VMware LLC. Although the disclosure is described with reference to VMs, the teachings herein also apply to other types of virtualized computing instances such as containers.

Standalone host 140 is constructed on a hardware platform 160 such as an x86 architecture platform. Hardware platform 160 includes the components of a computer described above with reference to hardware platform 126, such as one or more CPUs, memory, local storage, and one or more NICs. The CPU(s) of hardware platform 160 are configured to execute instructions such as executable instructions that perform one or more operations described herein, which may be stored in the memory of hardware platform 160. The local storage of hardware platform 160 includes binary files, which include data for executing, e.g., a base software image of a hypervisor, add-ons such as device drivers and firmware of a hypervisor, and software components for software solutions of a hypervisor. The NIC(s) of hardware platform 160 enable standalone host 140 to communicate with other devices over network 102.

Hardware platform 160 supports software 150, including a hypervisor 154. Hypervisor 154 supports the execution of multiple virtualized computing instances such as VMs 152. Hypervisor 154 is installed on standalone host 140 using the binary files of the storage of hardware platform 160. One example of hypervisor 154 is a VMware ESX® hypervisor, available from VMware LLC.

VM manager 170 logically groups hosts 110 into a cluster to perform cluster-level tasks such as provisioning and managing VMs 122 and migrating VMs 122 from one of hosts 110 to another. VM manager 170 also manages standalone host 140 individually and performs tasks therefor such as provisioning and managing VMs 152. For example, VM manager 170 may communicate with hosts 110 and 140 via a management network (not shown) provisioned from network 102. VM manager 170 may include a UI 172 and a lifecycle manager 174.

According to some embodiments, UI 172 is accessed by an administrator of computer system 100 to perform various functionalities. For example, through UI 172, the administrator may view, update, and apply a desired state for hosts 110 and 140 for hypervisors 124 and 154. According to other embodiments, such functionalities are performed automatically, e.g., by an artificial intelligence (AI) model trained to output selections of desired states. In other words, decisions such as to select a desired state may be made in a plurality of manners, including by an administrator viewing UI 172 and by software such as an AI model. Accordingly, as used herein, "administrator" may refer to a human viewing UI 172 to make desired state management decisions manually and may also refer to software making such decisions automatically.

Lifecycle manager 174 is software that performs various lifecycle functionalities for hypervisors 124 and 154 such as scanning binary files of hypervisors 124 and 154 to identify software components therefrom for generating desired state documents. VM manager 170 may be, e.g., a physical server including the components of a computer discussed above for hardware platform 126, or one of VMs 122 or 152. One example of VM management server 170 is VMware vCenter Server,® available from VMware LLC. Although only one instance of a VM manager is illustrated in FIG. 1, computer system 100 may include multiple VM managers, e.g., one for managing hosts 110 and another for managing standalone host 140.

Image depot 180 is a storage device such as one or more magnetic drives or SSDs used by VM manager 170 for desired-state management of hypervisors 124 and 154. Image depot 180 may include binary files, including copies of binary files 134 of hardware platform 126 of each of hosts 110 and the binary files of hardware platform 160 of standalone host 140. Image depot 180 may also include desired state documents defining the desired states of the hypervisors of hosts 110 and 140. For example, each desired state document may be a JSON file identifying a base software image of a hypervisor, add-ons such as device drivers and firmware of a hypervisor, and software components for software solutions of a hypervisor. Image depot 180 may also include desired state metadata such as metadata associating desired state documents with hosts 110 or with standalone host 140.

Figure 2A:
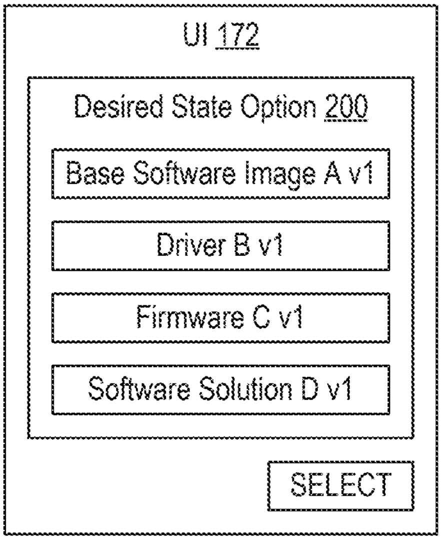
FIG. 2A is a block diagram illustrating an example of a UI of a VM manager of the computer system when generating a desired state document for a standalone host.

FIG. 2A is a block diagram illustrating an example of UI 172 when generating a desired state document for a standalone host such as standalone host 140 of FIG. 1. UI 172 illustrates a desired state option 200, which is automatically generated based on binary files currently installed in storage of the standalone host. Based on the binary files, lifecycle manager 174 identifies version 1 ("v1") of a base software image called "Base Software Image A." Lifecycle manager 174 also identifies v1 of a driver for a hardware device in the standalone host called "Driver B."

Lifecycle manager 174 also identifies v1 of firmware for a hardware device in the standalone host called "Firmware C." Lifecycle manager 174 also identifies v1 of one or more software components for a software solution called "Software Solution D." Lifecycle manager 174 may also identify additional drivers, firmware, and software components for software solutions (not shown). If an administrator wants to select desired state option 200 for the desired state of the hypervisor of the standalone host, the administrator may click a "SELECT" button of UI 172.

Figure 2B:
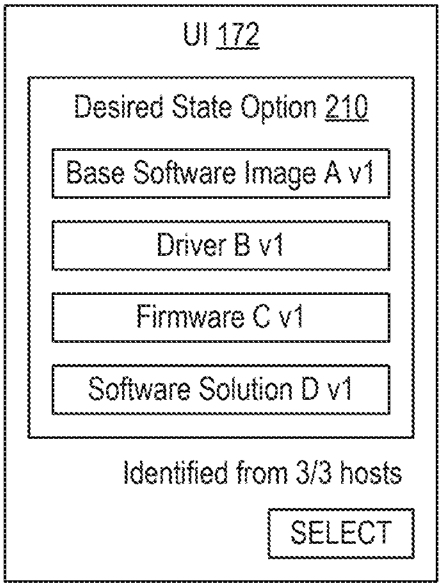
FIG. 2B is a block diagram illustrating an example of the UI when generating a desired state document for a cluster of hosts when hypervisors of the hosts are homogenous.

FIG. 2B is a block diagram illustrating an example of UI 172 when generating a desired state document for a cluster of hosts such as hosts 110 of FIG. 1, when hypervisors of the hosts are homogenous. In the example of FIG. 2B, because the hypervisors are homogenous, lifecycle manager 174 identifies the same software in the binary files from the storage of each of the hosts. Lifecycle manager 174 thus only illustrates a single desired state option 210, which is automatically generated from the identified software of one of the hosts. In the example of FIG. 2B, the cluster includes three hosts, but the number of hosts may be two or may be greater than three.

Based on the binary files, lifecycle manager 174 identifies v1 of Base Software Image A, v1 of Driver B, v1 of Firmware C, and v1 of Software Solution D. Lifecycle manager 174 may also identify additional drivers, firmware, and software components for software solutions (not shown). UI 172 indicates that desired state option 210 was identified from the binary files in all three hosts of the cluster. If an administrator wants to select desired state option 210 for the desired state of the hypervisor for all the hosts of the cluster, the administrator may click a "SELECT" button of UI 172.

Figure 2C:
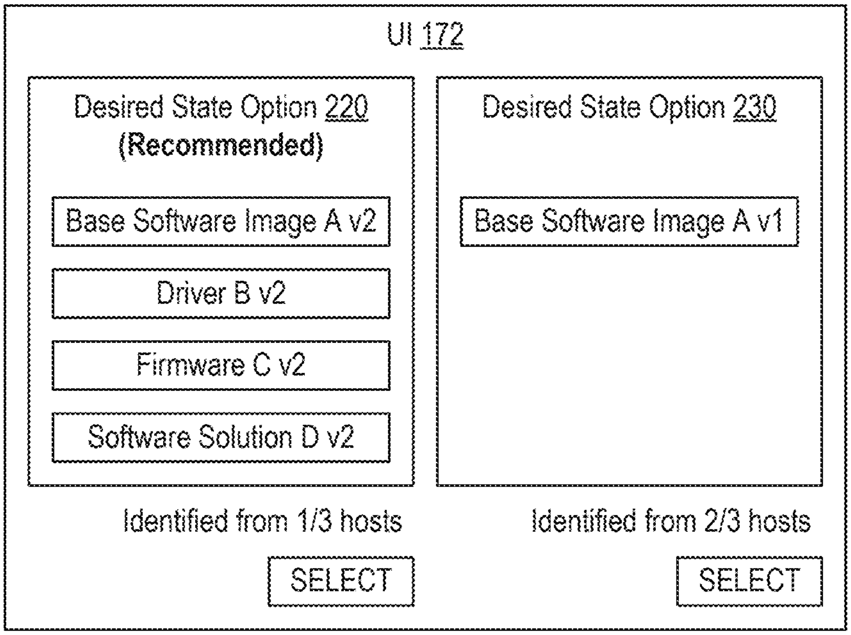
FIG. 2C is a block diagram illustrating a first example of the UI when generating a desired state document for a cluster of hosts when hypervisors of the hosts are heterogenous.

FIG. 2C is a block diagram illustrating a first example of UI 172 when generating a desired state document for a cluster of hosts such as hosts 110 of FIG. 1, when hypervisors of the hosts are heterogenous. In the example of FIG. 2C, because the hypervisors are heterogenous, lifecycle manager 174 identifies different software in the binary files from the storage devices of the hosts. Lifecycle manager 174 thus generates a plurality of desired state options, including desired state options 220 and 230. In the example of FIG. 2C, the cluster includes three hosts, but the number of hosts may be two or may be greater than three.

Based on the binary files of one of the three hosts, lifecycle manager 174 identifies version 2 ("v2") of Base Software Image A, v2 of Driver B, v2 of Firmware C, and v2 of Software Solution D. Based on the binary files of the other two hosts, lifecycle manager 174 identifies v1 of Base Software Image A, but no additional drivers, firmware, or software components for software solutions. If an administrator wants to select desired state option 220 or 230 for the desired state of the hypervisors of all the hosts of the cluster, the administrator may click a "SELECT" button under the respective desired state option. In an example such as that of FIG. 2C in which there are multiple desired state options, lifecycle manager 174 may recommend one of the desired state options to the administrator via UI 172. In the example of FIG. 2C, lifecycle manager 174 prioritizes the desired state option with the most recently released version of the base software image, i.e., the version that was most recently made available by a developer of the base software image for installing on the hosts. Lifecycle manager 220 thus recommends desired state option 220 (with v2 of Base Software Image A) over desired state option 230 (with v1 of Base Software Image A).

Figure 2D:
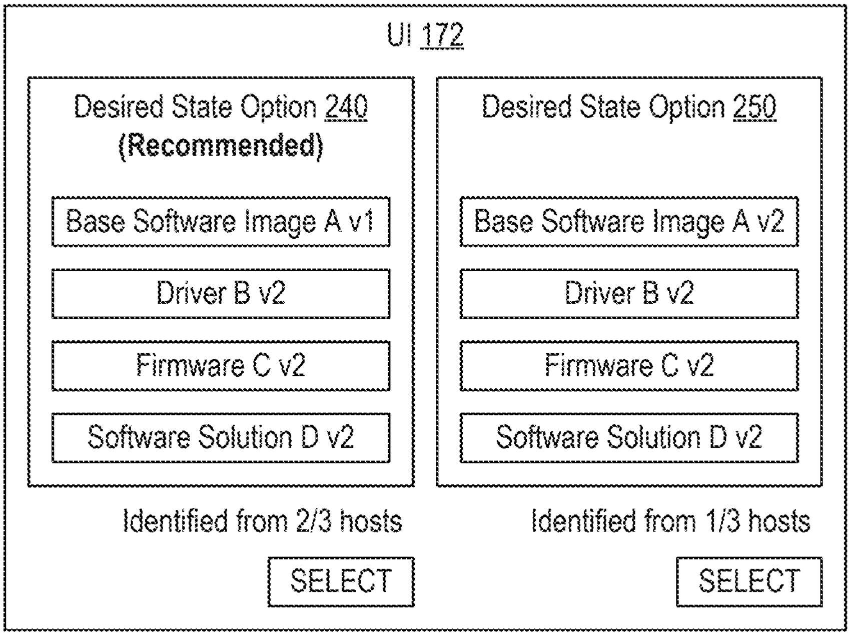
FIG. 2D is a block diagram illustrating a second example of the UI when generating a desired state document for a cluster of hosts when hypervisors of the hosts are heterogenous.

FIG. 2D is a block diagram illustrating a second example of UI 172 when generating a desired state document for a cluster of hosts such as hosts 110 of FIG. 1, when hypervisors of the hosts are heterogenous. In the example of FIG. 2D, because the hypervisors are heterogenous, lifecycle manager 174 identifies different software in the binary files from the storage devices of the hosts. Lifecycle manager 174 thus generates a plurality of desired state options, including desired state options 240 and 250. In the example of FIG. 2D, the cluster includes three hosts, but the number of hosts may be two or may be greater than three.

Based on the binary files of two of the three hosts, lifecycle manager 174 identifies v1 of Base Software Image A, v2 of Driver B, v2 of Firmware C, and v2 of Software Solution D. Based on the binary files of the other host, lifecycle manager 174 identifies v2 of Base Software Image A, v2 of driver B, v2 of Firmware C, and v2 of Software Solution D. If an administrator wants to select desired state option 240 or 250 for the desired state of the hypervisors of all the hosts of the cluster, the administrator may click a "SELECT" button under the respective desired state option. In the example of FIG. 2D, lifecycle manager 174 prioritizes the desired state option with the most commonly installed software among the hosts of the cluster. Lifecycle manager 174 thus recommends desired state option 240 (installed on two hosts) over desired state option 250 (installed on one host).

Figure 3:
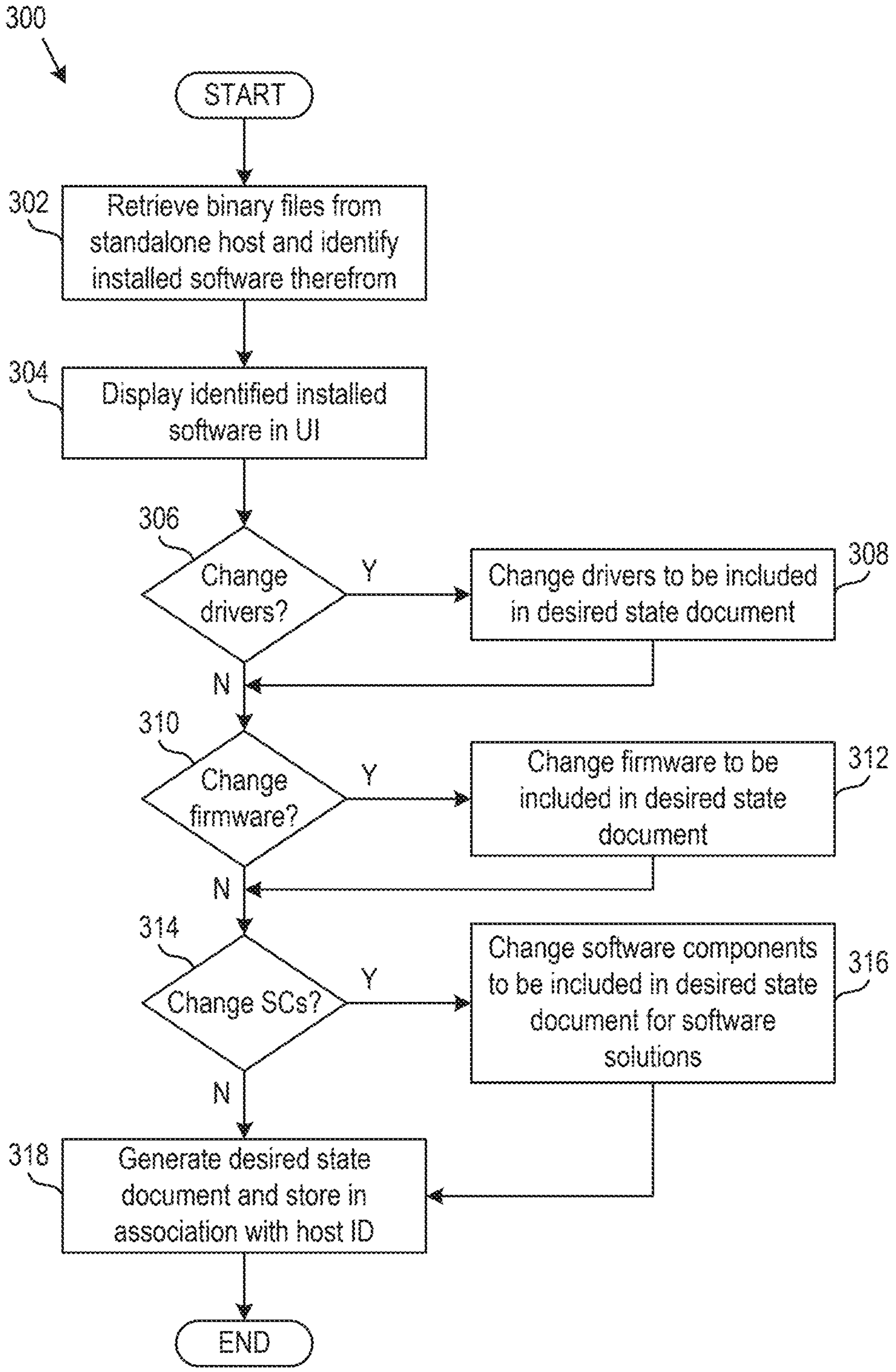
FIG. 3 is a flow diagram of a method that may be performed by the VM manager to generate a desired state document for a standalone host, according to some embodiments.

FIG. 3 is a flow diagram of a method 300 that may be performed by VM manager 170 to generate a desired state document for a standalone host such as standalone host 140 of FIG. 1, according to some embodiments. At step 302, lifecycle manager 174 retrieves binary files from the standalone host and identifies software of a hypervisor installed on the standalone host from the retrieved binary files. For example, lifecycle manager 174 may search the retrieved binary files for information indicating the installed software such as names and version numbers of a base software image of the hypervisor, add-ons such as device drivers and firmware of the hypervisor, and additional software components of software solutions of the hypervisor. Lifecycle manager 174 may also store the retrieved binary files in image depot 180. At step 304, lifecycle manager 174 displays the identified installed software in UI 172 as a desired state option.

After step 304, upon an administrator selecting the displayed desired state option, lifecycle manager 174 provides the administrator the option to make one or more changes to the selected desired state option. At step 306, if the administrator selects via UI 172 to make changes to the drivers to be included in the desired state document, method 300 moves to step 308. At step 308, based on the administrator's selections via UI 172, lifecycle manager 174 changes the drivers to be included, e.g., by adding drivers, removing drivers, or changing drivers to more or less recently released versions of those drivers. Returning to step 306, if the administrator did not select to make changes to the drivers, method 300 moves directly to step 310.

At step 310, if the administrator selects via UI 172 to make changes to the firmware to be included in the desired state document, method 300 moves to step 312. At step 312, based on the administrator's selections via UI 172, lifecycle manager 174 changes the firmware to be included, e.g., by adding firmware, removing firmware, or changing firmware to more or less recently released versions of that firmware. Returning to step 310, if the administrator did not select to make changes to the firmware, method 300 moves directly to step 314. At step 314, if the administrator selects via UI 172 to make changes to other software components for software solutions to be included in the desired state document, method 300 moves to step 316. At step 316, based on the administrator's selections via UI 172, lifecycle manager 174 changes such software components to be included, e.g., by adding software components, removing software components, or changing software components to more or less recently released versions of those software solutions. Returning to step 314, if the administrator did not select to make changes to such software components, method 300 moves directly to step 318.

At step 318, lifecycle manager 174 generates the desired state document to identify software based on the selected desired state option and any optional changes made at steps 308, 312, and 316. Lifecycle manager 174 stores the generated desired state document in image depot 180 along with desired state metadata such as an identifier (ID) of the standalone host, associating the desired state document with the standalone host. After step 318, method 300 ends. It should be noted that method 300 may be performed without human administrator input, e.g., by software generating the desired state document without requiring a human administrator to select a desired state option via UI 172 and without providing options via UI 172 for changing the drivers, firmware, and other software components. While identified installed software may be transmitted to a human administrator via UI 172, as illustrated in step 304, such identified installed software may also be transmitted to a software administrator, e.g., software including an AI model. Such software administrator may also select to change the drivers, firmware, and other software components.

Figure 4:
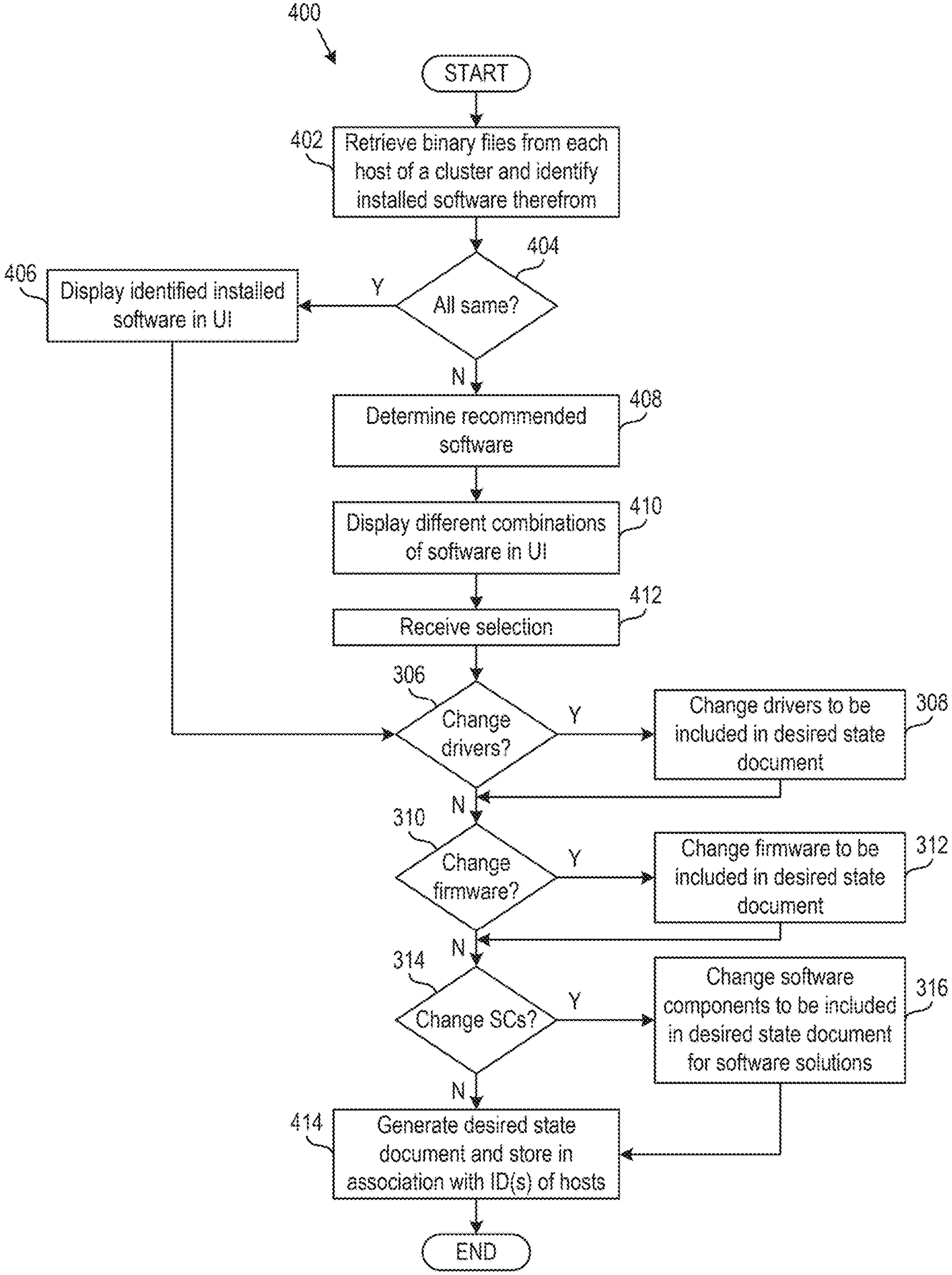
FIG. 4 is a flow diagram of a method that may be performed by the VM manager to generate a desired state document for a cluster of hosts, according to some embodiments.

FIG. 4 is a flow diagram of a method 400 that may be performed by VM manager 170 to generate a desired state document for a cluster of hosts such as hosts 110 of FIG. 1, according to some embodiments. Steps that are the same as those of FIG. 3 have the same numbers and will not be reexplained. At step 402, lifecycle manager 174 retrieves binary files from each of the hosts and identifies software of hypervisors installed on the hosts from the retrieved binary files. For example, for each of the hosts, lifecycle manager 174 may search the respective binary files for information indicating the installed software such as names and version numbers of a base software image of the respective hypervisor, add-ons such as device drivers and firmware of the hypervisor, and additional software components of software solutions of the hypervisor. Lifecycle manager 174 may also store the retrieved binary files in image depot 180.

At step 404, if the same software is identified from each of the hosts (i.e., if the hypervisors of the hosts are homogenous), method 400 moves to step 406. At step 406, lifecycle manager 174 displays the identified installed software from any of the hosts in UI 172 as a desired state option. After step 406, upon an administrator selecting the displayed desired state option, method 400 moves to step 306. Returning to step 404, if there is at least one difference in the identified software between any two of the hosts (i.e., if the hypervisors of the hosts are heterogeneous), method 400 moves to step 408. For example, the versions of base software images installed by the hosts may be different. As another example, one of the hosts may have installed a driver, firmware, or a software component for a software solution, that another of the hosts has not installed. As another example, a version of a driver, firmware, or a software component for a software solution, installed by one of the hosts, may be different from a corresponding driver, firmware, or software component installed by another of the hosts.

At step 408, lifecycle manager 174 may analyze the different combinations of software identified from the binary files and determines which combination to recommend. As just one example, lifecycle manager 174 may select for recommendation, the combination with the most recently released version of a base software image. As another example, lifecycle manager 174 may select for recommendation, the combination with the most commonly installed software among the hosts of the cluster. At step 410, lifecycle manager 174 displays in UI 172, each of the different combinations of software identified from the binary files as desired state options. Lifecycle manager 174 may also illustrate in UI 172, which of the desired state options was selected for recommendation. At step 412, lifecycle manager 174 receives a selection of one of the displayed desired state options.

Steps 306, 310, and 314 (and optionally steps 308, 312, and 316), may then be performed to further customize the desired state, as discussed above in conjunction with FIG. 3, and then method 400 moves to step 414. At step 414, lifecycle manager 174 generates the desired state document to identify software based on the selected desired state option and any optional changes made at steps 308, 312, and 316. Lifecycle manager 174 stores the generated desired state document in image depot 180 along with desired state metadata such as an ID of the cluster or IDs of each of the hosts, associating the desired state document with the hosts. After step 414, method 400 ends.

It should be noted that method 400 may be performed without human administrator input, e.g., by software generating the desired state document without requiring an administrator to select a desired state option via UI 172 and without providing options via UI 172 for changing the drivers, firmware, and other software components. In such solution, if the hypervisors are heterogenous, lifecycle manager 174 may automatically generate the desired state document based on the desired state option determined at step 408, e.g., based on a decision from a software administrator such as software including an AI model. While identified installed software may be transmitted to a human administrator via UI 172, as illustrated in steps 406 and 410, such identified installed software may also be transmitted to such a software administrator. Additionally, while information recommending a particular option may be transmitted to a human administrator via UI 172, such information may instead be transmitted to such a software administrator. Such software administrator may also select to change the drivers, firmware, and other software components.

Figure 5:
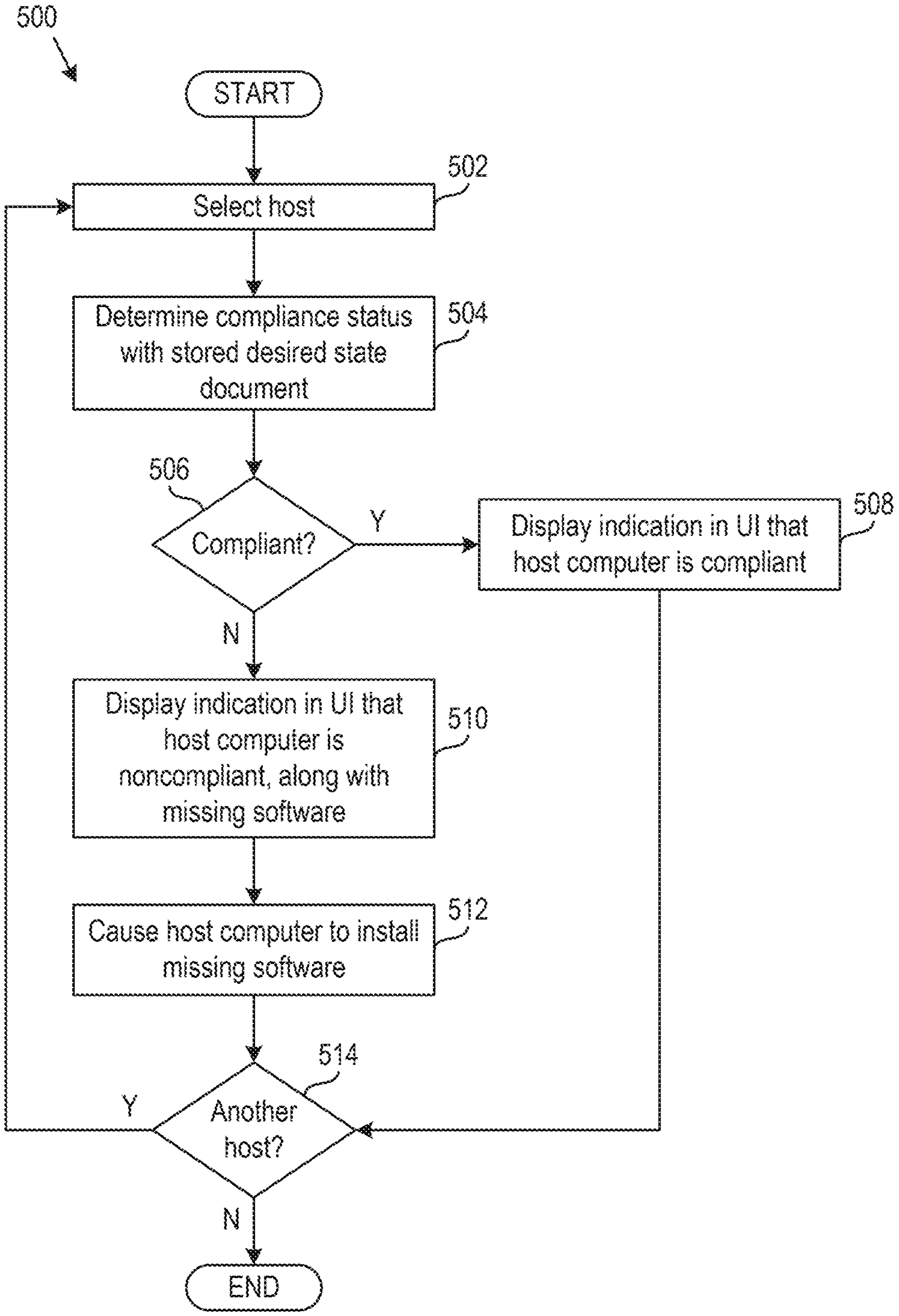
FIG. 5 is a flow diagram of a method that may be performed by the VM manager to cause one or more hosts to update hypervisors thereof according to a desired state document, according to some embodiments.

FIG. 5 is a flow diagram of a method 500 that may be performed by VM manager 170 to cause one or more hosts to update hypervisors thereof according to a desired state document, according to some embodiments. Method 500 may be performed for a standalone host such as standalone host 140 of FIG. 1 or for a cluster of hosts such as hosts 110 of FIG. 1. Method 500 may be performed in response to a new desired state document being associated with one or more hosts. Method 500 may also be performed at predetermined intervals to periodically check the compliance of one or more hosts with a desired state document assigned thereto.

At step 502, lifecycle manager 174 selects a host for updating. For example, lifecycle manager 174 may extract desired state metadata from image depot 180 indicating that a host or cluster of hosts is associated with a desired state document stored in image depot 180. At step 504, lifecycle manager 174 determines a compliance status of the selected host with the stored desired state document. For example, lifecycle manager 174 may retrieve the current binary files from the selected host, search the retrieved binary files for information indicating installed software such as names and version numbers of a base software image of a hypervisor, add-ons such as device drivers and firmware of the hypervisor, and additional software components of software solutions of the hypervisor. Lifecycle manager 174 may then compare software identified in the stored desired state document with corresponding software identified from the retrieved binary files.

At step 506, if the selected host is compliant with the stored desired state document based on the comparison, i.e., if the selected host has installed therein the software identified by the stored desired state document, including the correct versions identified by the stored desired state document, method 500 moves to step 508. At step 508, lifecycle manager 174 displays in UI 172, an indication that the selected host is compliant with the stored desired state document. Returning to step 506, if the selected host is noncompliant, i.e., if the selected host does not have installed therein the software identified by the stored desired state document, including the correct versions identified by the stored desired state document, method 500 moves to step 510. At step 510, lifecycle manager 174 displays in UI 172, an indication that the selected host is noncompliant, along with an indication of which software identified by the stored desired state document is not installed in the selected host.

At step 512, lifecycle manager 174 causes the selected host to install the missing software. For example, lifecycle manager 174 may cause the selected host to install or update a base software image of the hypervisor, add-ons such as device drivers and firmware of the hypervisor, and additional software components of software solutions of the hypervisor, to match software identified by the stored desired state document (including installing the versions of such software identified by the stored desired state document). Step 512 may involve prompting an administrator, e.g., via UI 172, to manually install the missing software on the selected host. Step 512 may also be automated, VM manager 170 transmitting a command to the selected host to install the missing software, in response to which the selected host installs the missing software. At step 514, if there is another host for which to check compliance with the stored desired state document (in the case of a cluster of hosts), method 500 returns to step 502. Otherwise, after step 514, method 500 ends.

It should be noted that method 500 may be performed without human administrator input. For example, a host's compliance status may be transmitted to a software administrator such as software including an AI model, that then decides to cause a selected host to install missing software when the host is noncompliant with a stored desired state document. While the compliance status may be transmitted to a human administrator via UI 172, as illustrated in steps 508 and 510, such compliance status may also be transmitted to such a software administrator.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

The embodiments described herein also relate to an apparatus for performing these operations. The apparatus may be specially constructed for required purposes, or the apparatus may be a general-purpose computer selectively activated or configured by a computer program stored in the computer. The embodiments described herein may also be practiced with computer system configurations including mobile computing devices, personal computers, server computers, microprocessor systems, mainframe computers, etc., and combinations thereof, which may communicate across one or more networks.

The embodiments described herein also relate to one or more computer programs or as one or more computer program modules embodied in computer-readable storage media. The term computer-readable medium refers to any data storage device that can store data, which can thereafter be input into an apparatus or computer system. Computer-readable media may be based on any existing or subsequently developed technology that embodies computer programs in a manner that enables a computer to read the programs. Examples of computer-readable media include magnetic drives, SSDs, network-attached storage (NAS) systems, RAM, read-only memory (ROM), CDs, digital versatile disks (DVDs), and other optical and non-optical data storage devices. A computer-readable medium can also be distributed over a network-coupled computer system so that computer-readable code is stored and executed in a distributed fashion.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

As used herein, the phrase "at least one of" preceding a series of items with the term "and" or "or" to separate any of the items, modifies the list as a whole, rather than each member of the list (i.e., each item). The phrase "at least one of" does not require selection of at least one of each item listed. Rather, the phrase allows a meaning that includes at least one of any one of the items, and/or at least one of any combination of the items. By way of example, the phrases "at least one of A, B, and C" and "at least one of A, B, or C" each refers to only A, only B, only C, and/or any combination of A, B, and C. In any instances in which it is intended that a selection be of "at least one of each of A, B, and C," or alternatively, "at least one of A, at least one of B, and at least one of C," the selection is expressly described as such.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components may be implemented as a combined component. Similarly, structures and functionalities presented as a single component may be implemented as separate components. These and other variations, additions, and improvements may fall within the scope of the appended claims.

What is claimed is:

1. A management computer including a processor and memory, wherein the processor executes instructions stored in the memory to manage a desired state for hypervisors of a plurality of host computers, by performing the following steps:

retrieving from each of the host computers, a plurality of binary files of a hypervisor executing on the host computer;

for the hypervisor of each of the host computers, identifying installed software from the retrieved plurality of binary files, including: (1) a version of a base software image of the hypervisor, and (2) one or more of: a driver of the hypervisor, firmware of the hypervisor, and a software component for a software solution of the hypervisor; and in response to a selection of the identified installed software for the hypervisor of a first host computer of the host computers:

generating a desired state document including the selected installed software; and determining, for each of the host computers, a compliance status of the host computer with the generated desired state document.

2. The management computer of claim 1, wherein the steps further include:

determining that the first host computer is compliant with the generated desired state document;

determining that a second host computer of the host computers is noncompliant with the generated desired state document; and transmitting, to an administrator of the management computer, an indication that the first host computer is compliant with the generated desired state document and an indication that the second host computer is noncompliant with the generated desired state document.

3. The management computer of claim 2, wherein the steps further include:

transmitting a command to the second host computer to perform one of: (1) installing the version of the base software image of the hypervisor of the first host computer, and (2) installing a version of: the driver of the first host computer, the firmware of the first host computer, or the software component of the first host computer for the software solution.

4. The management computer of claim 1, wherein the steps further include:

transmitting, to an administrator of the management computer, the identified installed software for the hypervisor of a second host computer of the host computers, wherein the identified installed software for the hypervisors of the first and second host computers differ in at least one of the following manners: (1) the versions of the base software images of the hypervisors of the first and second host computers are different, (2) one of the first and second host computers has installed a driver, firmware, or a software component for a software solution, that the other of the first and second host computers has not installed, and (3) a version of a driver, firmware, or a software component for a software solution installed by the first host computer is different from a corresponding driver, firmware, or software component for a software solution installed by the second host computer.

5. The management computer of claim 4, wherein the versions of the base software images of the hypervisors of the first and second host computers are different, and wherein the steps further include:

determining that the version of the base software image of the hypervisor of the first host computer is a more recently released version than the version of the base software image of the hypervisor of the second host computer; and in response to determining that the version of the base software image of the hypervisor of the first host computer is more recently released, transmitting, to the administrator, information recommending the identified installed software for the hypervisor of the first host computer, for the desired state document.

6. The management computer of claim 4, wherein the steps further include:

determining that the identified installed software for the hypervisor of the first host computer is installed on more of the host computers than the identified installed software for the hypervisor of the second host computer; and in response to determining that the identified installed software for the hypervisor of the first host computer is installed on more of the host computers, transmitting, to the administrator, information recommending the identified installed software for the hypervisor of the first host computer, for the desired state document.

7. The management computer of claim 1, wherein the steps further include:

in response to an additional selection, generating the desired state document to identify one or more of: one or more drivers that are not included in the identified installed software for the hypervisor of the first host computer, firmware that is not included in the identified installed software for the hypervisor of the first host computer, and one or more software components for a software solution that are not included in the identified installed software for the hypervisor of the first host computer.

8. A method of managing a desired state for hypervisors of a plurality of host computers, the method comprising:

retrieving from each of the host computers, a plurality of binary files of a hypervisor executing on the host computer;

for the hypervisor of each of the host computers, identifying installed software from the retrieved plurality of binary files, including: (1) a version of a base software image of the hypervisor, and (2) one or more of: a driver of the hypervisor, firmware of the hypervisor, and a software component for a software solution of the hypervisor; and in response to a selection of the identified installed software for the hypervisor of a first host computer of the host computers:

generating a desired state document including the selected installed software; and determining, for each of the host computers, a compliance status of the host computer with the generated desired state document.

9. The method of claim 8, further comprising:

determining that the first host computer is compliant with the generated desired state document;

determining that a second host computer of the host computers is noncompliant with the generated desired state document; and transmitting, to an administrator of a management computer, an indication that the first host computer is compliant with the generated desired state document and an indication that the second host computer is noncompliant with the generated desired state document.

10. The method of claim 9, further comprising:

transmitting a command to the second host computer to perform one of: (1) installing the version of the base software image of the hypervisor of the first host computer, and (2) installing a version of: the driver of the first host computer, the firmware of the first host computer, or the software component of the first host computer for the software solution.

11. The method of claim 8, further comprising:

transmitting, to an administrator of a management computer, the identified installed software for the hypervisor of a second host computer of the host computers, wherein the identified installed software for the hypervisors of the first and second host computers differ in at least one of the following manners: (1) the versions of the base software images of the hypervisors of the first and second host computers are different, (2) one of the first and second host computers has installed a driver, firmware, or a software component for a software solution, that the other of the first and second host computers has not installed, and (3) a version of a driver, firmware, or a software component for a software solution installed by the first host computer is different from a corresponding driver, firmware, or software component for a software solution installed by the second host computer.

12. The method of claim 11, wherein the versions of the base software images of the hypervisors of the first and second host computers are different, the method further comprising:

determining that the version of the base software image of the hypervisor of the first host computer is a more recently released version than the version of the base software image of the hypervisor of the second host computer; and in response to determining that the version of the base software image of the hypervisor of the first host computer is more recently released, transmitting, to the administrator, information recommending the identified installed software for the hypervisor of the first host computer, for the desired state document.

13. The method of claim 11, further comprising:

determining that the identified installed software for the hypervisor of the first host computer is installed on more of the host computers than the identified installed software for the hypervisor of the second host computer; and in response to determining that the identified installed software for the hypervisor of the first host computer is installed on more of the host computers, transmitting, to the administrator, information recommending the identified installed software for the hypervisor of the first host computer, for the desired state document.

14. The method of claim 8, further comprising:

in response to an additional selection, generating the desired state document to identify one or more of: one or more drivers that are not included in the identified installed software for the hypervisor of the first host computer, firmware that is not included in the identified installed software for the hypervisor of the first host computer, and one or more software components for a software solution that are not included in the identified installed software for the hypervisor of the first host computer.

15. A non-transitory computer-readable medium comprising instructions that are executable in a management computer, wherein the instructions when executed cause the management computer to carry out a method of managing a desired state for hypervisors of a plurality of host computers, and wherein the method comprises:

retrieving from each of the host computers, a plurality of binary files of a hypervisor executing on the host computer;

for the hypervisor of each of the host computers, identifying installed software from the retrieved plurality of binary files, including: (1) a version of a base software image of the hypervisor, and (2) one or more of: a driver of the hypervisor, firmware of the hypervisor, and a software component for a software solution of the hypervisor; and in response to a selection of the identified installed software for the hypervisor of a first host computer of the host computers:

generating a desired state document including the selected installed software; and determining, for each of the host computers, a compliance status of the host computer with the generated desired state document.

16. The non-transitory computer-readable medium of claim 15, wherein the method further comprises:

determining that the first host computer is compliant with the generated desired state document;

determining that a second host computer of the host computers is noncompliant with the generated desired state document; and transmitting, to an administrator of the management computer, an indication that the first host computer is compliant with the generated desired state document and an indication that the second host computer is noncompliant with the generated desired state document.

17. The non-transitory computer-readable medium of claim 16, wherein the method further comprises:

transmitting a command to the second host computer to perform one of: (1) installing the version of the base software image of the hypervisor of the first host computer, and (2) installing a version of: the driver of the first host computer, the firmware of the first host computer, or the software component of the first host computer for the software solution.

18. The non-transitory computer-readable medium of claim 15, wherein the method further comprises:

transmitting, to an administrator of the management computer, the identified installed software for the hypervisor of a second host computer of the host computers, wherein the identified installed software for the hypervisors of the first and second host computers differ in at least one of the following manners: (1) the versions of the base software images of the hypervisors of the first and second host computers are different, (2) one of the first and second host computers has installed a driver, firmware, or a software component for a software solution, that the other of the first and second host computers has not installed, and (3) a version of a driver, firmware, or a software component for a software solution installed by the first host computer is different from a corresponding driver, firmware, or software component for a software solution installed by the second host computer.

19. The non-transitory computer-readable medium of claim 18, wherein the versions of the base software images of the hypervisors of the first and second host computers are different, and wherein the method further comprises:

determining that the version of the base software image of the hypervisor of the first host computer is a more recently released version than the version of the base software image of the hypervisor of the second host computer; and in response to determining that the version of the base software image of the hypervisor of the first host computer is more recently released, transmitting, to the administrator, information recommending the identified installed software for the hypervisor of the first host computer, for the desired state document.

20. The non-transitory computer-readable medium of claim 18, wherein the method further comprises:

determining that the identified installed software for the hypervisor of the first host computer is installed on more of the host computers than the identified installed software for the hypervisor of the second host computer; and in response to determining that the identified installed software for the hypervisor of the first host computer is installed on more of the host computers, transmitting, to the administrator, information recommending the identified installed software for the hypervisor of the first host computer, for the desired state document.

* * * * *